United States Patent
Ramsperger et al.

(10) Patent No.: US 11,712,834 B2
(45) Date of Patent: Aug. 1, 2023

(54) VALVE UNIT

(71) Applicant: Eugen Seitz AG, Wetzikon (CH)

(72) Inventors: Marcel Ramsperger, Wetzikon (CH); Joachim Schmidt, Hettlingen (CH); Christian Elbs, Ennetbuehl (CH)

(73) Assignee: Eugen Seitz AG, Wetzikon (CH)

( * ) Notice: Subject to any disclaimer, the term of this patent is extended or adjusted under 35 U.S.C. 154(b) by 24 days.

(21) Appl. No.: 16/767,739

(22) PCT Filed: Nov. 19, 2018

(86) PCT No.: PCT/EP2018/081742
§ 371 (c)(1),
(2) Date: May 28, 2020

(87) PCT Pub. No.: WO2019/105783
PCT Pub. Date: Jun. 6, 2019

(65) Prior Publication Data
US 2021/0001534 A1     Jan. 7, 2021

(30) Foreign Application Priority Data

Nov. 29, 2017 (EP) .................................. 17204455

(51) Int. Cl.
*B29C 49/42* (2006.01)
*F16K 31/122* (2006.01)
(Continued)

(52) U.S. Cl.
CPC ...... *B29C 49/4289* (2013.01); *F16K 31/1228* (2013.01); *B29L 2031/7158* (2013.01); *F16K 1/465* (2013.01); *F16K 39/022* (2013.01)

(58) Field of Classification Search
CPC .............. F16K 31/1228; F16K 31/122; F16K 31/1225; F16K 1/465; F16K 1/427;
(Continued)

(56) References Cited

U.S. PATENT DOCUMENTS 1,983,163 A * 12/1934 Buckman ................ F16K 1/427
251/357
2,806,481 A * 9/1957 Faust ................... G05D 16/163
137/116.5
(Continued)

FOREIGN PATENT DOCUMENTS

CN        102656003 A    9/2012
DE           1052762 B    3/1959
(Continued)

*Primary Examiner* — Craig J Price
*Assistant Examiner* — Andrew J Rost
(74) *Attorney, Agent, or Firm* — The Webb Law Firm

(57) ABSTRACT

A valve unit includes a valve housing having an input line and an output line or the process pressure as well as a process guide shaft, an operating piston for closing and opening a connection between the two lines, two control lines and two control chambers for controlling the operating piston. The operating piston has a closing ring which in the closed state of the connection sealingly abuts a valve seat of the valve housing and it has a diameter which corresponds to a guide diameter of a dynamic process seal. The valve seat includes a softer and more elastic material than the sealing edge. The valve unit has low axial forces, due to low sealing forces, thus makes a long service life with a high number of cycles of operation possible.

16 Claims, 6 Drawing Sheets

(51) Int. Cl.
*B29L 31/00* (2006.01)
*F16K 1/46* (2006.01)
*F16K 39/02* (2006.01)

(58) Field of Classification Search
CPC . F16K 31/124; F16K 39/022; B29C 49/4289; B29L 2031/7158
USPC .......................... 251/62, 63, 63.5, 282, 363
See application file for complete search history.

(56) References Cited

U.S. PATENT DOCUMENTS

| | | | | |
|---|---|---|---|---|
| 3,572,382 | A * | 3/1971 | Luthe | F16K 39/022 |
| | | | | 137/625.35 |
| 3,722,860 | A * | 3/1973 | Curran | F16K 47/02 |
| | | | | 251/332 |
| 3,752,190 | A * | 8/1973 | Brake | F16K 31/1266 |
| | | | | 137/627.5 |
| 3,873,063 | A * | 3/1975 | Illing | F16K 39/022 |
| | | | | 251/282 |
| 4,007,906 | A * | 2/1977 | Karpenko | F16K 31/122 |
| | | | | 251/30.02 |
| 4,137,934 | A * | 2/1979 | Rice | F16K 27/02 |
| | | | | 251/282 |
| 4,267,861 | A * | 5/1981 | Roth | F16K 3/267 |
| | | | | 137/625.48 |
| 4,694,730 | A * | 9/1987 | Krieger | E21D 23/26 |
| | | | | 91/170 MP |
| 7,628,376 | B2 * | 12/2009 | Masamura | F16K 31/1221 |
| | | | | 251/63.6 |
| 8,413,955 | B1 | 4/2013 | Rooney | |
| 9,709,994 | B2 * | 7/2017 | Vogt | G05D 7/0635 |
| 10,437,267 | B2 * | 10/2019 | Brunner | B29C 49/783 |
| 2001/0007354 | A1 * | 7/2001 | Tokuda | F16K 1/42 |
| | | | | 251/363 |
| 2007/0102048 | A1 | 5/2007 | Bravo | |
| 2009/0020722 | A1 * | 1/2009 | Masamura | F16K 31/122 |
| | | | | 251/331 |
| 2009/0283160 | A1 | 11/2009 | Fishwick et al. | |
| 2012/0001370 | A1 * | 1/2012 | Zacche' | F16K 31/124 |
| | | | | 264/523 |
| 2012/0201918 | A1 | 8/2012 | Elbs | |
| 2012/0216882 | A1 * | 8/2012 | Fishwick | F16K 31/1268 |
| | | | | 137/488 |
| 2016/0139613 | A1 | 5/2016 | Brunner et al. | |
| 2016/0258538 | A1 * | 9/2016 | Liu | F16K 1/42 |

FOREIGN PATENT DOCUMENTS

| | | |
|---|---|---|
| DE | 3636739 A1 | 5/1987 |
| DE | 102014000814 A1 | 7/2015 |
| EP | 1450083 A1 | 8/2004 |
| EP | 1574771 A2 | 9/2005 |
| EP | 2142830 B1 | 11/2010 |
| EP | 2335904 A1 | 6/2011 |
| EP | 2402143 A1 | 1/2012 |
| EP | 3009252 A1 | 4/2016 |
| EP | 3009352 A1 | 4/2016 |
| EP | 3020531 A1 | 5/2016 |
| GB | 909405 | 10/1962 |
| GB | 1550459 A | 8/1979 |
| JP | S6155476 A | 3/1986 |
| WO | 2005028931 A1 | 3/2005 |
| WO | 2015121285 A1 | 8/2015 |
| WO | 2016030593 A1 | 3/2016 |
| WO | 2017021243 A1 | 2/2017 |

* cited by examiner

VALVE UNIT

CROSS-REFERENCE TO RELATED APPLICATIONS

This application is the United States national phase of International Application No. PCT/EP2018/081742 filed Nov. 19, 2018, which claims priority to European Patent Application No. 17 204 455.4 filed Nov. 29, 2017, the disclosures of which are hereby incorporated by reference in their entirety.

BACKGROUND

Technical Field

The present invention relates to a valve unit, in particular for pneumatic operation in a blow-molding process. The valve unit is suitable, in particular, for use in an extrusion blow-molding machine or a stretch blow-molding machine for producing hollow bodies made of plastics material.

Technical Considerations

For the manufacture of plastics bottles, in particular PP or PET bottles, (PP=polypropylene; PET=polyethylene terephthalate) a blank or a preform is blown into its final shape in a blow-molding machine, in particular an extrusion blow-molding machine or a stretch blow-molding machine. To this end, the blank is held in a blow mold by its bottle neck, which already has its final shape, and is connected to a compressed air system. By blowing compressed air through the bottle neck the blank is inflated and brought into its final shape.

The blow-molding process generally takes place in a two-step method, wherein in a first step compressed air at a pressure of 2 to 20 bar is blown in via a pre-blowing valve and in a subsequent second step the final blow-molding is carried out via a main blowing valve by means of a pressure of 15 to 40 bar. Moreover, a venting valve is generally used in order to discharge the pressure from the finished blown bottle. A recovery valve is also known, said recovery valve being arranged between the main blowing valve and the venting valve in order to recover a portion of the compressed air used.

All of these valves have to be activated for the process sequence. It is essential here that the individual process steps have to take place very rapidly and, therefore, the valves have to have response times which are as short as possible. Only then is an economical production ensured. It is also important that the valves have a high number of cycles of operation and thus a long service life.

Pneumatically actuated valves, which use the compressed air which is already available as a working medium, have proved advantageous.

EP 1 574 771 A2 discloses such an air-controlled valve. Said valve comprises an operating piston displaceably arranged in a valve housing, a process pressure input line, a process pressure output line and a control pressure line. The operating piston has a lower front face which in the closed position of the valve closes the process pressure input line relative to the process pressure output line. An opposing upper front face is oriented toward a valve chamber. A channel running inside the operating piston connects these two front faces together. The active surface of the lower front face in the closed state of the valve is smaller than the active surface of the upper front face so that the operating piston is retained by the process pressure in its closed position. The operating piston also has a piston ring protruding radially outwardly, the lower annular surface thereof serving as a control surface. Said piston ring is located in an annular control chamber which is connected to a control pressure line. The upper annular surface is located in a further chamber which is subjected to ambient pressure. The control surface is larger than the difference between the lower and upper active surface in the closed state of the valve. If a pressure is now applied to the control chamber, the operating piston is raised and the valve is opened. A relatively low pressure is already sufficient therefor. In one embodiment, the lower front face has a downwardly protruding, radially inwardly offset collar which is designed to achieve an improved sealing action due to the reduced abutment surface on the valve housing.

EP 2 142 830 B1 also discloses an air-controlled valve. In this case, therefore, two opposing control surfaces are present, wherein the lower first control chamber may be selectively subjected to a constant pressure or ambient pressure by means of a pilot valve and the upper second control chamber is permanently subjected to a constant pressure. The first control surface is smaller than the second control surface so that when the constant pressure is applied in the second control chamber a differential force is produced between the first and second control chamber and the operating piston is raised. A valve seal is arranged on the control piston, said valve seal having on its circumference a circumferential, downwardly protruding collar. This collar forms a closing surface which cooperates with a valve seat of the valve housing. Since when the operating piston is raised, i.e. when the valve is opened, the first and second active surface become approximately the same size, only a small expenditure of force is required for a rapid and complete opening of the valve. It is also advantageous that the valve is also able to be controlled when the two valve chambers have the same pressure level. This valve is characterized by a rapid response time and thus a rapid opening which is practically independent of the level of the process pressure. However, as before, this valve unit requires relatively high axial sealing forces in the region of 1000 N and thus a pilot valve with a correspondingly large nominal diameter.

WO 2015/121285 A1 discloses an air-controlled valve with two pilot valves which control the pressure in the two control chambers independently of one another.

Such process valves require high sealing forces of up to 1200 N in order to maintain the leakage limit values in the operating state of 0 to 40 bar. Pilot-controlled valve units, i.e. valve units which as described above have at least one control chamber connected to a pilot valve, require relatively large control surfaces therefor. This leads to large control volumes which in turn is contrary to the requirement for rapidly operating valves since the large control volumes have to be filled and emptied again sufficiently rapidly. Thus pilot valves with relatively large nominal diameters are used in order to ensure a sufficiently rapid filling and emptying thereof, said pilot valves operating more slowly, however, than pilot valves with smaller nominal diameters. Said pilot valves are additionally more expensive and require more space. The prevailing high sealing and acceleration forces limit the operating time and additionally minimize the number of cycles of operation and also the service life of the valve unit. In principle, the following applies: the higher the sealing forces and the kinetic energies in the valve unit, the lower the number of cycles of operation to be achieved and the shorter the service life of the valve unit.

SUMMARY

It is an object of the invention, therefore, to provide a valve unit which reduces the axial sealing forces to a minimum and thus increases the service life of the valve unit.

The valve unit according to the invention comprises a valve housing having a process pressure input line, a process pressure output line and a process guide shaft. Said valve unit further comprises an operating piston for closing and opening a connection between the process pressure input line and the process pressure output line, wherein the operating piston defines a longitudinal central axis. Moreover, the valve unit comprises a first and a second control line and a first and a second control chamber for controlling the operating piston, wherein the operating piston can be displaced in the axial direction within the process guide shaft in a sealed manner by means of a dynamic process seal. The operating piston has a closing ring which in the closed state of the connection sealingly abuts a valve seat of the valve housing. As an alternative to this feature, the valve housing may have a closing ring which in the closed state of the connection sealingly abuts against a valve seat of the operating piston. According to the invention, the closing ring is designed as a circumferential sealing edge, wherein the valve seat consists of a softer and more elastic material than the sealing edge abutting said valve seat and the circumferential sealing edge has a diameter which corresponds to a guide diameter of the dynamic process seal.

The dynamic process seal is defined here as the dynamic seal which seals the operating piston relative to the valve chamber, i.e. the chamber of the valve unit subjected to process pressure between the input and output.

The sealing edge is configured to be as narrow as possible with a small abutment surface. Preferably, said sealing edge is approximately linear.

The wording selected above encompasses the idea that the valve unit according to the invention may also comprise more than two control lines and control chambers. Preferably, however, just two control lines and two control chambers are present.

The air-controlled valve unit according to the invention has a minimized sealing surface so that in the case of low axial force a high surface pressure may be produced. In particular, a process pressure of 40 bar in both directions, i.e. bidirectionally, is able to provide a seal. The selected soft and hard material pairing of the two sealing partners, however, compensates for unevenness which may be present, so that the seal is ensured.

The use of identical seal diameters of the seat seal and the adjacent dynamic process seal additionally prevents forces which are dependent on the process pressure from being generated in the direction of movement toward the mobile operating piston.

Preferably, the operating piston has a sealing cap which is of wedge-shaped configuration and the circumferential tip thereof forms the sealing edge. The wedge-shaped configuration leads to an optimal introduction of force toward the sealing edge and also serves to provide the supplied compressed air with an optimal throughflow path when the valve is opened.

In a preferred embodiment, the valve seat is embedded in a valve seat ring arrangement, wherein the valve seat ring arrangement consists of a harder material than the valve seat. The embedding ensures that the valve seat is not able to be deflected to the side by the prevailing forces. Such a deflection could impair the sealing performance.

Preferably, an annular sealing element which forms the valve seat is present, wherein the sealing element has the shape of a truncated cone with an outwardly widening base. As a result, the sealing element may be optimally fixed in order to withstand even large forces. The sealing element additionally forms a buffer.

In preferred embodiments, a first active surface and a second active surface which counteract one another and which are able to be subjected to a process pressure are present. The first and the second active surface are of the same size. As a result, the operating piston may be controlled independently of the process pressure.

Each of the control chambers is connected via a pilot bore to a pilot valve. Preferably, 3/2 way valves are used therefor. Pilot valves having relatively small nominal diameters may be used. Typical nominal diameters are ca. 1 mm.

Preferably, the operating piston has a first control surface which faces the first control chamber and a second control surface which faces the second control chamber. In each case these two control surfaces are able to be subjected to a pilot pressure. The control surfaces are preferably of the same size. This has the advantage that the opening and closing forces are equal in size.

Preferably, at least one of the two control chambers, preferably both control chambers, are of cylindrical configuration and are arranged centrally to the longitudinal central axis of the operating piston. This arrangement permits the formation of relatively small control chambers and the use of relatively small control surfaces. As a result, the control chambers may be filled and emptied rapidly. The valve unit may thus be operated relatively rapidly. Since the applied forces are relatively small, by minimizing the control chambers, the service life of the valve unit is also increased.

In preferred embodiments, a first and a second dynamic control chamber seal are present, wherein the guide diameters of these two dynamic control chamber seals are of the same size and are arranged centrally relative to the longitudinal central axis of the operating piston.

Preferably, the guide diameter of the dynamic process seal is larger than at least one of the guide diameters of the first and second control chamber seal. Even further preferably, the guide diameter of the dynamic process seal is larger than both guide diameters of the first and second control chamber seal. This arrangement reduces the volume of the control chambers.

The teaching according to the invention may be implemented by differently shaped operating pistons. Three preferred variants are mentioned hereinafter. In a first variant, the operating piston has a piston foot, a piston head and a piston ring, wherein the piston ring has a larger external diameter than the piston foot and the piston head. The piston foot and the piston head have the same external diameter. The valve housing has a first cylindrical central blind bore for receiving the piston foot and a second cylindrical central blind bore for receiving the piston head. The first control chamber is configured in the first blind bore and the second control chamber is configured in the second blind bore. The circumferential sealing edge is configured on the piston ring.

In a second variant, the operating piston has a base body with an H-shaped longitudinal section and a piston ring, wherein the base body forms a downwardly open first receiver and an upwardly open second receiver. A fixed foot element and a fixed head element are configured on the valve housing, wherein the foot element engages in the first receiver and the head element engages in the second receiver. The first receiver forms the first control chamber and the second receiver forms the second control chamber. The circumferential sealing edge is configured in turn on the piston ring. This operating piston has a smaller mass than the operating piston of the first variant. Additionally, it has a very small longitudinal extent.

In a third variant, the operating piston has a base body with a U-shaped longitudinal section and a piston ring, wherein the base body forms an upwardly open first receiver. A fixed foot element is configured on the valve housing, wherein the foot element engages in the first receiver. The first receiver forms the first control chamber. The valve housing has an annular gap around the piston ring, wherein the annular gap forms the second control chamber. The circumferential sealing edge is configured in turn on the piston ring. This operating piston is also configured to be very compact and short. Additionally, the valve unit may be configured as a whole to be very compact and short due to the annular second control chamber.

The operating piston is preferably configured to be solid, i.e. without a core bore. Preferably, however, it has throughbores for connecting the valve chamber to a pressure compensation chamber.

The valve unit according to the invention described hereinafter may also be used without equal diameters of the dynamic seal and the seat seal. This valve unit may also be characterized by a long service life due to the special embedding and shape of the sealing element. This valve unit may also be combined in any manner with the features of the claims subsequent to claim 1.

This valve unit according to the invention comprises a valve housing having a process pressure input line, a process pressure output line and a process guide shaft. Said valve housing also comprises an operating piston for closing and opening a connection between the process pressure input line and the process pressure output line and at least one control line and at least one control chamber for controlling the operating piston. The operating piston can be displaced in the axial direction within the process guide shaft in a sealed manner by means of a dynamic process seal.

The operating piston has a closing ring which in the closed state of the connection sealingly abuts against a valve seat of the valve housing. Alternatively, the valve housing may have a closing ring which in the closed state of the connection sealingly abuts against a valve seat of the operating piston. According to the invention, the closing ring is configured as a circumferential sealing edge, wherein the valve seat consists of a softer and more elastic material than the sealing edge abutting the valve seat. To this end, an annular sealing element which forms the valve seat is present, wherein the sealing element has the shape of a truncated cone with an outwardly widening base, wherein the sealing element is embedded in a valve seat ring arrangement and wherein the valve seat ring arrangement consists of a harder material than the valve seat.

BRIEF DESCRIPTION OF THE DRAWINGS

Preferred embodiments of the invention are described hereinafter with reference to the drawings which merely serve for the description and are not to be interpreted as limiting. In the drawings.

The same parts are provided with the same reference numerals.

DESCRIPTION OF PREFERRED EMBODIMENTS

Figure 1:
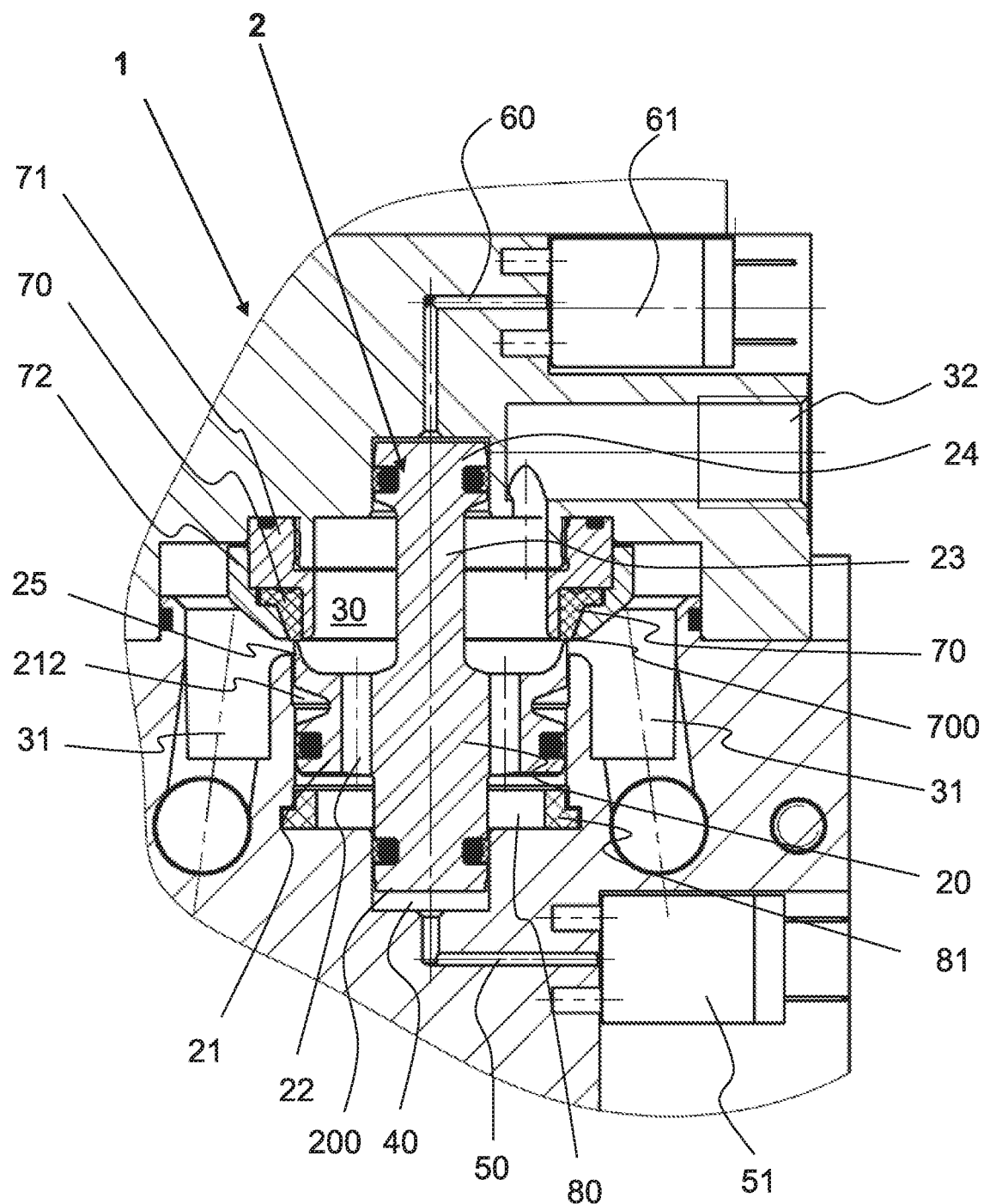
FIG. 1 shows a longitudinal section through a valve unit according to the invention in a first embodiment in the closed valve position.
Figure 2:
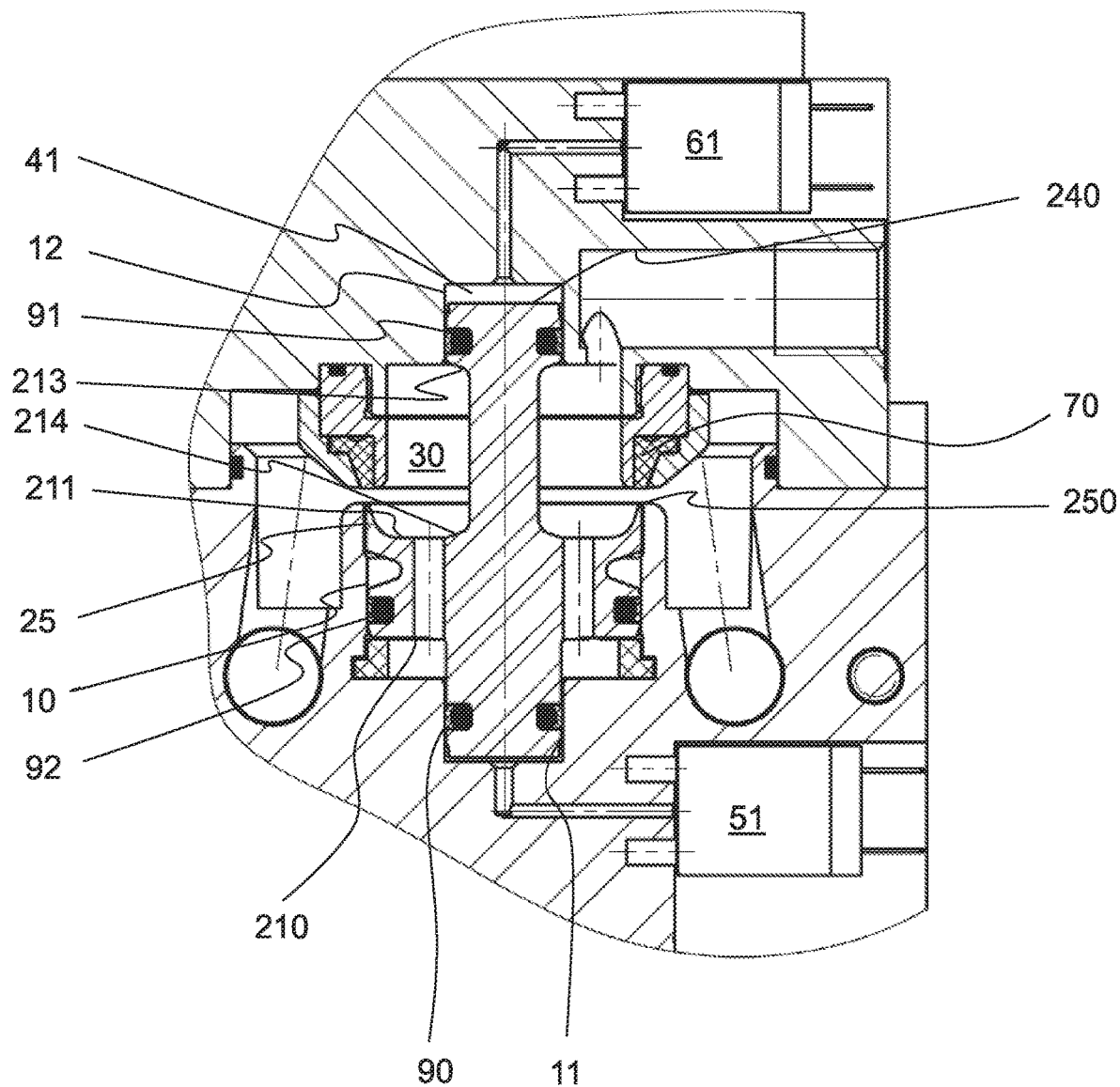
FIG. 2 shows the valve unit according to FIG. 1 in the open valve position.

A first embodiment of a valve unit according to the invention is shown in FIGS. 1 and 2. Said valve unit has a valve housing 1 which is preferably configured in two parts or multiple parts. Said valve housing may comprise, in particular, inserts. The housing 1 is preferably produced from metal or a rigid plastics material.

The housing 1 has in the interior a substantially rotationally symmetrical cavity with different internal diameters in the axial direction. A part of this cavity is configured as a rotationally symmetrical valve chamber 30, at least one process pressure input line 31 leading therein and at least one process pressure output line 32 leading therefrom. The process pressure input line 31 is preferably of annular configuration as may be identified in FIGS. 1 and 2. Other shapes are possible.

The process pressure input line 31 is able to be connected to a compressed air source, not shown. The process pressure output line 32 is able to be connected to a blow-molding unit, also not shown. Examples of such a blow-molding unit are a blow mold and a blow mold support for retaining a blank of a plastics bottle.

An operating piston 2 is arranged in the cavity, said operating piston being movable inside the cavity and a connection between the process pressure input line 31 and the process pressure output line 32 opening and reclosing as a result of this movement. The operating piston is preferably produced from a rigid plastics material or a metal, in particular from a coated metal.

At least one pilot valve controls the movement of the operating piston 2 inside the valve housing 1. In this case a first pilot valve 51 is present, said first pilot valve being connected via a first pilot line, in this case called the first control line or first pilot bore 50, to the cavity of the valve housing 1, more specifically to a first control chamber 40. Moreover, a second pilot valve 61 is present, said second pilot valve also being connected via a second pilot line, in this case called the second control line or wide pilot bore 60, to the cavity of the valve housing 1, more specifically to a second control chamber 41. The pilot valves 51, 61 are preferably 3/2-way valves. Alternatively, instead of two 3/2-way valves a common 5/2-way valve may also be used.

The operating piston 2 is preferably configured in one piece. Said operating piston substantially has a piston foot 20, a radially outwardly protruding piston ring 21 arranged thereon, with radially extending, continuous pressure compensation bores 22, a piston neck 23 adjoining the piston foot 20 and a piston head 24 adjacent thereto. The operating piston 2 is preferably configured to be entirely rotationally symmetrical, preferably in all of these regions.

The cavity of the valve housing 1 tapers in one respective step toward the piston foot 20 and toward the piston head 24.

A first and a second central blind bore, which in each case form a hollow-cylindrical lower and upper guide shaft with the same diameter, are configured. These guide shafts are denoted hereinafter as the upper and lower control guide shaft 11, 12.

The piston foot 20 has a lower first front face 200 facing the first control chamber 40. The piston head 24 additionally has an upper second front face 240 facing the second control chamber 41. The two front faces 200, 240 form a first and a second control surface, the first and/or the second control pressure of the pilot valves 51, 61 acting thereon. The control pressure is also called the pilot pressure. These pressures are preferably configured to be of the same value. The two control surfaces are both preferably configured rotationally symmetrically and they are preferably both arranged concentrically to the longitudinal central axis of the operating piston.

The piston foot 20 and the piston head 24 have on the circumference thereof circumferential first and second sealing rings 90, 91 which sealingly abut against the inner surfaces of the control guide shafts 11, 12 and which, when the operating piston 2 moves, form one respective lower and upper dynamic control chamber seal. The sealing rings 90, 91 are preferably formed from a suitably soft and elastic material, preferably from a plastics material. The guide diameters of these two dynamic control chamber seals are preferably of the same size. They are arranged centrally.

The cavity forms a further guide shaft which hereinafter is called the process guide shaft 10. The piston ring 21 has a circumferential third sealing ring 92 which sealingly abuts against the inner surface of the process guide shaft 10 and which, when the operating piston 2 moves, forms a further dynamic process seal. The piston ring 21 has on its outer jacket a circumferential annular groove 212 which minimizes the volume and thus the weight of the operating piston 2.

The piston ring 21 has a downwardly oriented annular third front face 210 which forms part of a first active surface of the valve unit, the process pressure acting thereon. This third front face 210 is preferably of planar configuration. The cavity forms in this region a pressure compensation chamber 80 which, due to an annular stop element 81 arranged therein, contains a minimum volume even in the open position of the operating piston 2. The stop element 81 is preferably configured to be soft and/or flexible and serves at the same time as a damping element. Said stop element preferably has an L-shaped longitudinal section and is held fixed in position in a correspondingly shaped receiver of the valve housing 1. aa The piston ring 21 has an upwardly oriented annular fourth front face 211 which faces the valve chamber 30. Said fourth front face forms part of a second active surface, the process pressure acting thereon and said second active surface counteracting the first active surface. Further surfaces, which oppose one another and which also form active surfaces, have the reference numerals 213 and 214. The surfaces 210 and 213 form a first active surface, and the surfaces 211 and 214 form a second active surface which is positioned against the first active surface.

The pressure compensation bores 22 connect this fourth front face 211 to the third front face 210 and ensure the pressure compensation. The surfaces which are effective in terms of pressure compensate one another so that as far as possible the valve closes irrespective of the pressure.

The fourth front face 211 in this example is of pot-shaped configuration and thus curved. Said fourth front face transitions outwardly into a raised edge oriented toward the piston head 24. The piston ring 21 thus has a sealing cap 25. This cap 25 has an outer surface which forms a linear, i.e. flush, extension of the remaining outer surface of the cylindrical piston ring 21.

The tip of the sealing cap 25 is configured as a circumferential sealing edge 250 which has a minimized material thickness. The inner periphery of the cap 25 runs obliquely so that the material thickness increases from the sealing edge 250 to the piston ring 21. The sealing cap is thus configured to be wedge-shaped on its internal periphery. This circumferential sealing edge 250 with the minimized front face forms a closing ring which in the closed valve position forms a static seal between the operating piston 2 and the valve housing 1 and thus interrupts the connection between the process pressure input line 31 and the process pressure output line 32.

The sealing edge 250 has a seal diameter which corresponds to the guide diameter of the dynamic process seal. Additionally, both are centrally arranged. This prevents the generation of forces, which are dependent on the process pressure, from acting in the direction of movement toward the operating piston.

Preferably, the guide diameter of the two dynamic control chamber seals is smaller than the guide diameter of the dynamic process seal, i.e. they are located, as may be identified clearly in FIGS. 1 and 2, closer to the longitudinal central axis of the operating piston 2. Preferably, the dynamic process seal is located in the axial direction between the first and the second dynamic control chamber seal, as may also be clearly identified in FIGS. 1 and 2. As a result, the operating piston 2 is optimally guided during the movement thereof.

To this end the valve housing 1 has a corresponding valve seat which is configured as an insert element of the valve housing 1 and thus is understood in this text as a component of the valve housing 1. The valve seat has a valve seat ring arrangement with an inner valve seat ring 71 and an outer valve seat ring 72 which are preferably connected together by a snug fit. The two valve seat rings 71, 72 are preferably produced from metal or a rigid plastics material. An annular sealing element 70 is retained between these two valve seat rings 71, 72. Said annular sealing element is preferably produced from a soft and/or flexible material. Preferably, it consists of plastics material.

The sealing element 70 preferably has a plane-parallel base which transitions via a horizontal step into a conically tapering truncated cone. The base is clamped between the two valve seat rings 71, 72. The free end of the truncated cone is located in a freely accessible manner between the two valve seat rings 71, 72 and forms a valve seat 700 or a seat surface, i.e. the effective valve seat for the sealed abutment of the sealing edge 250.

Since the sealing edge 250 consists of a harder material than the valve seat 700, an optimal seal is achieved, said seal also withstanding a high pressure inside the cavity and/or the process pressure input line 31, even in the case of low sealing forces. For example, a sealing force of 150 N is sufficient in order to withstand a pressure of 40 bar. Thus pilot valves with relatively small nominal diameters may be used.

When viewing FIGS. 1 and 2 together, therefore, the subdivision of the cavity into different chambers and the mode of operation of the valve unit may be identified.

In FIG. 1 the operating piston 2 is in the closed position of the valve. The sealing edge 250 presses against the valve seat 700. The access of the process pressure input line 31 into the valve chamber 30 is closed in an annular manner.

The first pilot valve 51 has subjected the first control chamber 40 to a pressure and the second pilot valve 61 has switched the second control chamber 41 to ambient pressure so that the operating piston 2 has been moved into the second control chamber 41 and the volume thereof minimized.

For opening the valve, therefore, a pressure is applied via the second pilot valve 61 in the second control chamber 41. If this pressure is greater than the pressure of the first control chamber 40 and/or if the pressure is reduced therein, the operating piston 2 is pushed downwardly. As a result, the sealing edge 250 is moved away from the valve seat 700 and the access into the valve chamber 30 is opened up. Compressed air for inflating the plastics bottles may pass through the process pressure input line 31 into the valve chamber 30 and from there through the process pressure output line 32 to the blank.

For reclosing the valve, once again the first control chamber 40 is now subjected to a pressure and the pressure in the second control chamber 41 is reduced to an ambient pressure so that the operating piston 2 again moves in the direction of the second control chamber 41.

Preferably, therefore, the first control chamber 40 is filled with compressed air and the second control chamber 41 is emptied in order to close the valve. When the valve is opened, the first control chamber 40 is emptied and the second control chamber 41 is filled.

Figure 3:
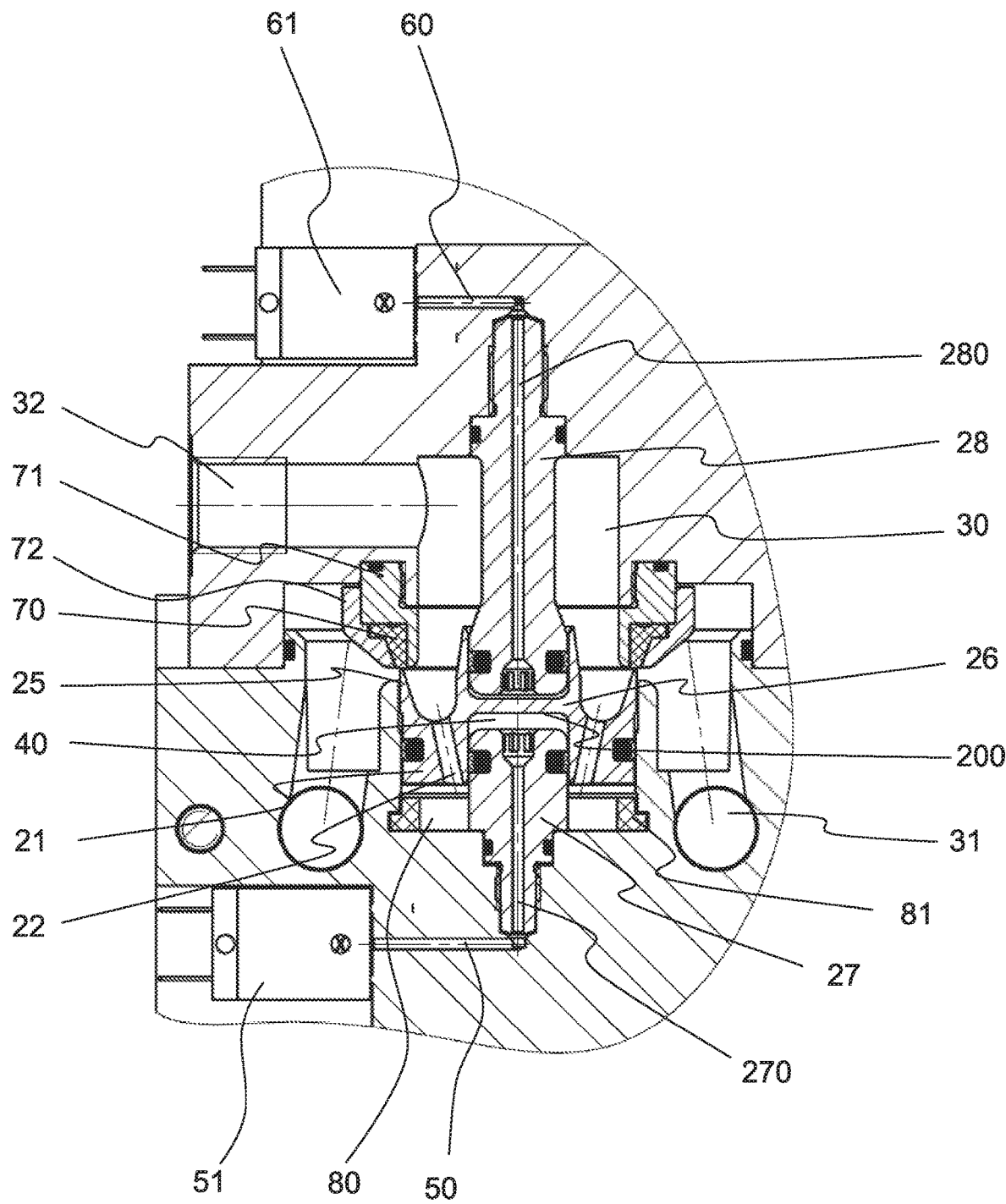
FIG. 3 shows a longitudinal section through a valve unit according to the invention in a second embodiment in the closed valve position.
Figure 4:
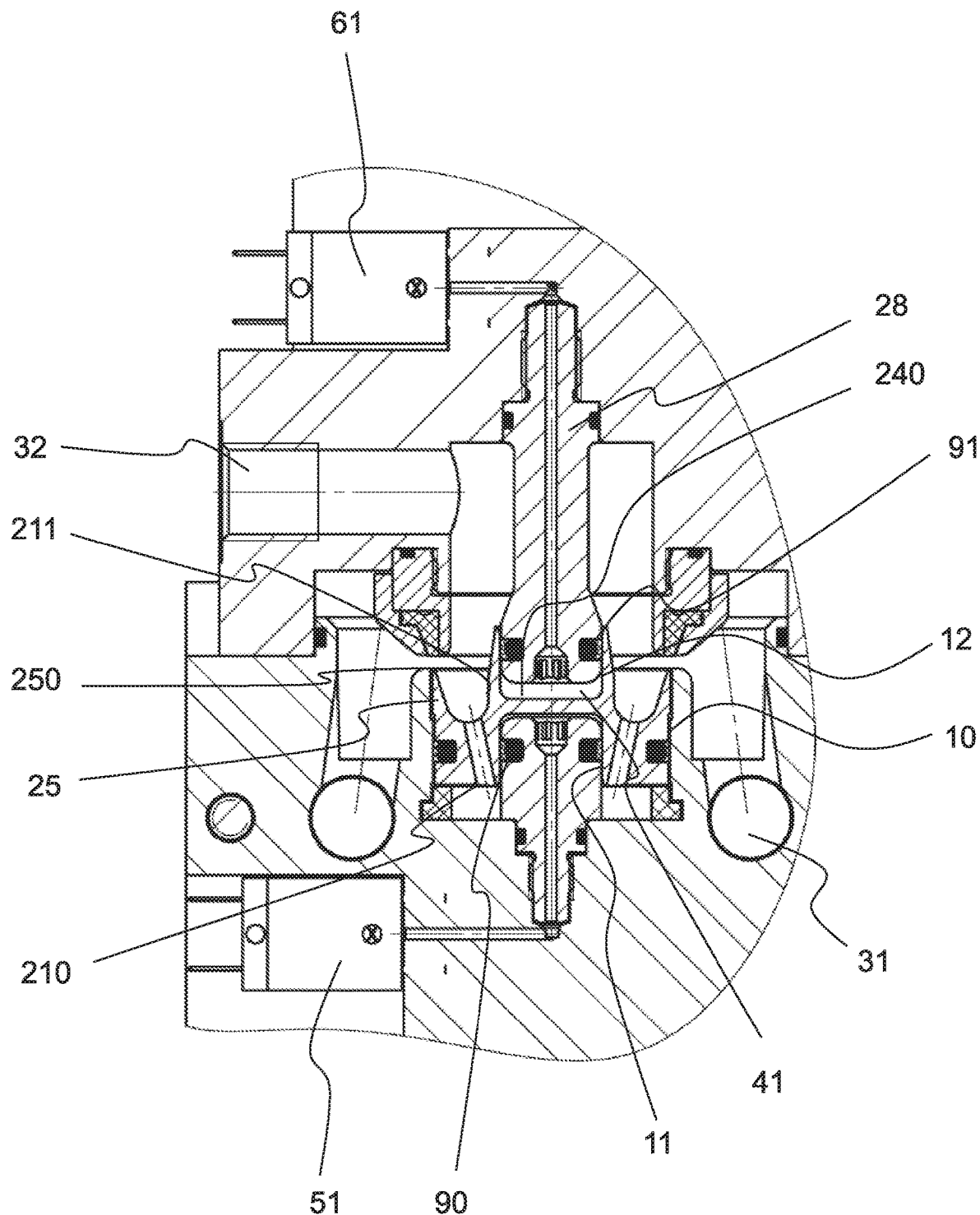
FIG. 4 shows the valve unit according to FIG. 3 in the open valve position.

In FIGS. 3 and 4 a second exemplary embodiment of the valve unit according to the invention is shown. The same parts are provided with the same reference numerals and are not described again in detail here. The valve unit has once again the valve housing 1 which forms a cavity. The process pressure input line 31 feeds into the cavity, more specifically into the valve chamber 30. The process pressure output line 32 leads out of said valve chamber. The valve chamber 30 is connected via a plurality of pressure compensation bores 22 to the pressure compensation chamber 80. The pressure compensation bores 22 run in this example obliquely to the longitudinal central axis of the valve unit, wherein they are preferably oriented in the direction of the pressure compensation chamber 80 toward the longitudinal central axis. The pressure compensation bores 22 of the second exemplary embodiment, however, as in the first exemplary embodiment may also run parallel to the longitudinal central axis of the operating piston and/or the pressure compensation bores of the first exemplary embodiment may also run obliquely, as shown here.

In the cavity of the valve housing 1 the valve seat is held fixed in position with the inner and outer valve seat ring 71, 72 and the sealing element 70 arranged therein. The sealing edge 250 abuts against the valve seat 700. The valve seat 700 in this case is preferably substantially larger than the abutment surface of the sealing edge 250, so that even a slight radial axial displacement of the operating piston 2 always leads to a sealed abutment. The sealing element 70 is held clamped between the inner and the outer valve seat ring 71, 72.

As may be seen clearly in FIGS. 3 and 4, the first and the second pilot valve 51, 61 are connected via pilot bores 50, 60 to a first and/or a second control chamber 40, 41.

As in the first exemplary embodiment, the operating piston 2, which is movable inside the cavity, is configured once again to be rotationally symmetrical, but smaller. In this second example said operating piston has a base body 26 with an H-shaped longitudinal section which forms an upper and a lower receiver opening.

As in the first example, the lower region of the base body 26 widens toward the radially outwardly protruding piston ring 21. The piston ring 21 has once again the already-described sealing cap 25 with the sealing edge 250 serving as a closing surface. The outer diameter of the sealing edge 250 corresponds in turn to the guide diameter of the dynamic process seal.

The lower receiver opening forms a first downwardly oriented front face 200. The upper receiver opening forms a second upwardly oriented front face 240. These two front faces 200, 240 form the first and second control surface for controlling the movement of the operating piston 2. Preferably, the two control surfaces are of the same size. The lower receiver opening of the base body 26 forms the first control chamber 40 and the upper receiver opening forms the second control chamber 41.

A foot element 27 which is fixed relative to the valve housing 1 protrudes into the lower receiver opening. A head element 28 which is fixed relative to the valve housing 1 protrudes into the upper receiver opening. The foot element 27 and the head element 28 are penetrated by an axially running first and/or second control bore 270, 280 which feed into the first and/or second pilot bore 50, 60, which lead to the first and/or second pilot valve 51, 61. The foot element 27 and the head element 28 are provided in each case with the circumferential first and/or second elastomeric, or other suitably configured, sealing ring 90, 91 in order to form the dynamic control seal when the operating piston 2 is moved.

The second embodiment has the advantage that the service life of the valve unit is longer in comparison with the first example. The reproducibility of the operating movement is improved and the valve unit thus operates as a whole more accurately.

In the two previously described embodiments the first and the second control chamber 40, 41 are configured cylindrically and are not subdivided. Additionally, an upper and a lower dynamic control chamber seal 90, 91 are present with the same guide diameters, the dynamic process seal 92 and the valve seal being arranged therebetween. Other arrangements are possible. Preferably, all of the exemplary embodiments described herein are operated bidirectionally, i.e. the input and the output may be exchanged with one another.

The guide diameter of the process seal 92 in the previous examples is larger than that of the control chamber seals 90, 91, wherein said guide diameter is the same size as the diameter of the sealing edge 250.

Figure 5:
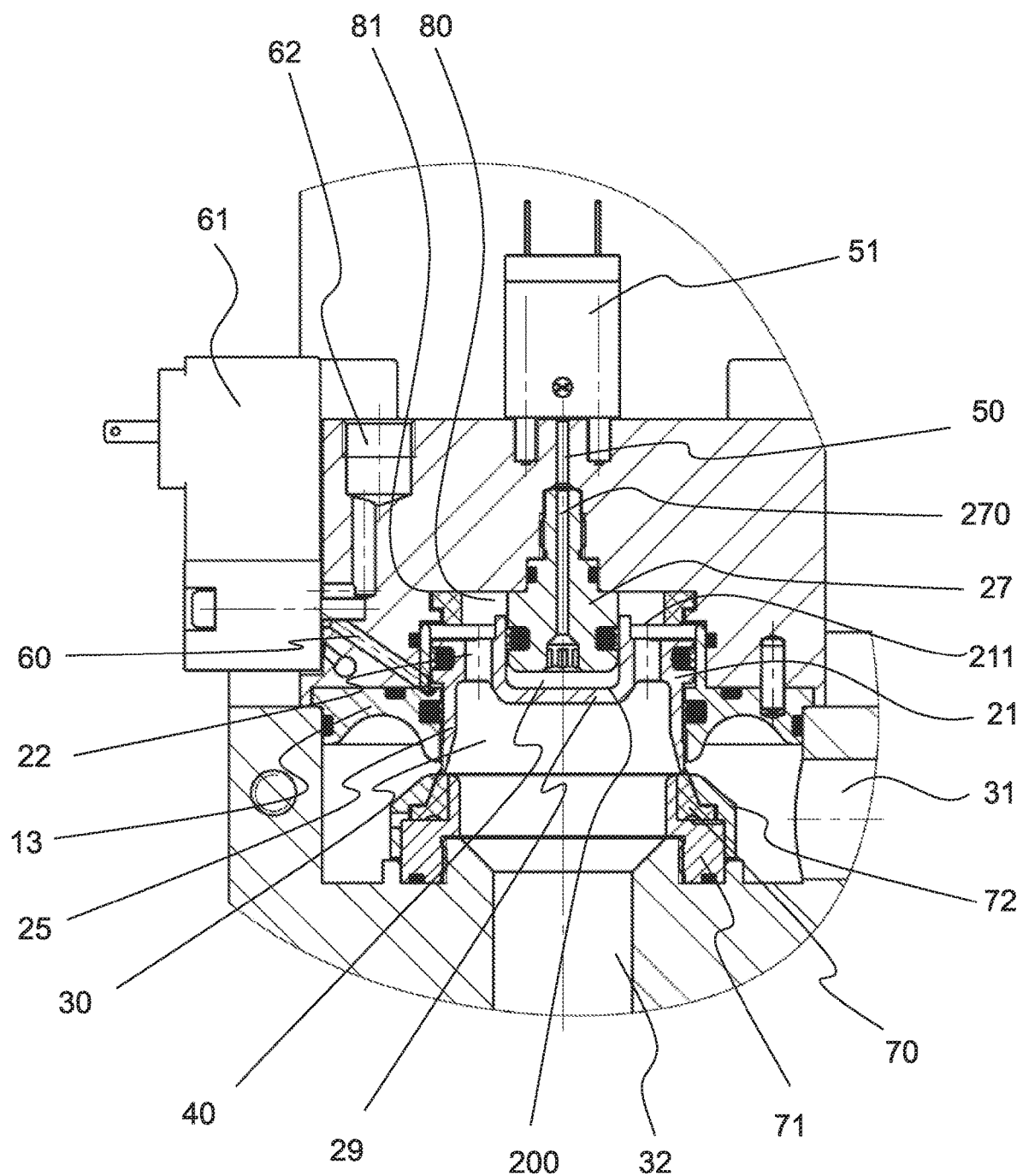
FIG. 5 shows a longitudinal section through a valve unit according to the invention in a third embodiment in the closed valve position and FIG. 6 shows the valve unit according to FIG. 5 in the open valve position.
Figure 6:
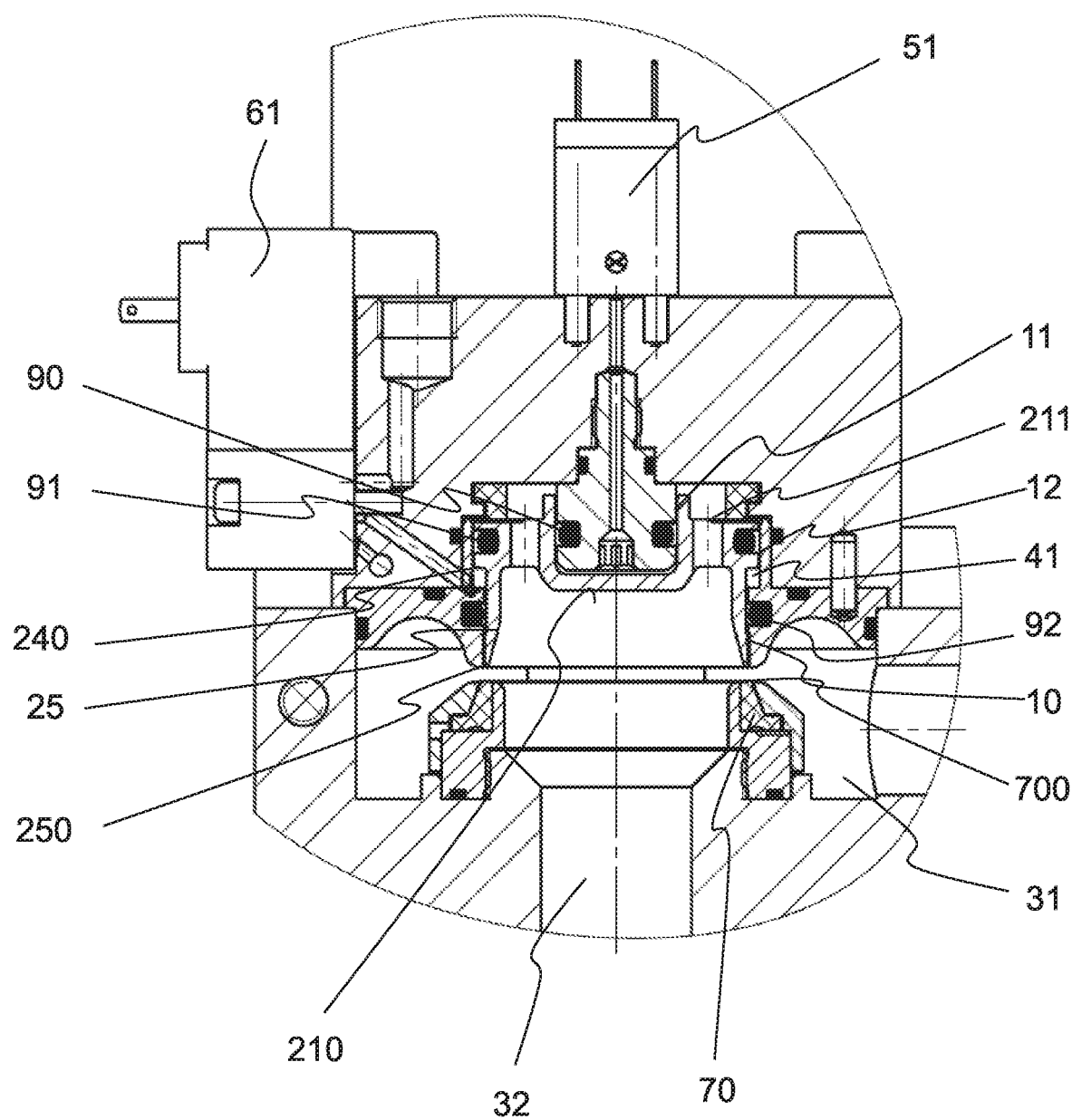

In the embodiment according to FIGS. 5 and 6, an arrangement which is altered thereto is present. In principle, this third embodiment is of similar construction so that the same parts having the same reference numerals are not described again in detail.

In the third example, the process pressure input line 31 leads through the valve seat, more specifically through the inner valve seat ring 71, into the valve chamber 30.

The operating piston 2 is configured in turn to be relatively small. Said operating piston consists of a base body 29 with a U-shaped longitudinal section, the piston ring 21 protruding radially outwardly therefrom. The piston ring 21 has the through-bores 22 for connecting the valve chamber 30 to the pressure compensation chamber 80. In this example the through-bores 22 are arranged axially parallel. However, the through-bores could also be arranged obliquely.

The piston ring 21 transitions into the sealing cap 25 with the annular closed circumferential sealing edge 250. In the region of the sealing cap 25 the valve housing 1 has an insert element in the form of a fixed sealing block 13. The sealing block 13 comprises the third sealing ring 92 which forms the dynamic process seal and which radially seals the sealing cap 25 which has moved relative to the sealing block 13. The outer diameter of the sealing edge 25 corresponds in turn to the guide diameter of this dynamic process seal.

The piston ring 21 has a slightly larger external diameter than the sealing cap 25.

The base body 29 forms an upwardly open receiver, the upwardly oriented bottom surface thereof forming the first front face 200 and thus the surface for the first control chamber 40 which is able to be subjected to pilot pressure. As before, this control chamber 40 is thus of cylindrical configuration without internal interruptions. In the valve housing 1, in a similar manner to the second example, the foot element 27 is retained fixedly and penetrated by a first control bore 270 which feeds into the first pilot bore 50 and leads to the first pilot valve 51. The first sealing ring 90 is arranged on the foot element 27, said first sealing ring providing a seal relative to the inner wall and forming the first dynamic control chamber seal.

The second control chamber 41 in this example is of annular configuration. The second control chamber is located in the transition region of the piston ring 21 with the sealing cap 25, as may be identified by viewing FIGS. 5 and 6 together. To this end, the valve housing 1 forms a corresponding annular groove.

The downwardly oriented circular front face of the piston ring 21 forms the second control surface 240 of the valve control. Preferably, the first and the second control surface 200, 240 are in turn configured to be of the same size. The second sealing ring 91 is arranged on the piston ring 21, said second sealing ring providing a seal relative to a corresponding wall of the sealing housing and forming the second dynamic control chamber seal.

Thus the guide diameter of the second dynamic control chamber seal in this third example is larger than that of the first dynamic control chamber seal. The guide diameter of the dynamic process seal is located in a region between these two diameters, wherein preferably it is merely slightly smaller than, or of the same size as, the guide diameter of the second dynamic control chamber seal.

The reference numeral 62 denotes a venting opening 62 for venting the second control chamber 41.

The valve unit according to this embodiment may be configured to be exceptionally compact.

The elements which are also shown in the drawings by means of black squares are static seals between fixed parts of the valve unit. These static seals are not provided with individual reference numerals.

The mode of operation of the valve units according to the second and third example is the same as in the first example and thus is not described in more detail.

The valve unit according to the invention has low axial forces, due to low sealing forces, and thus makes a long service life with a high number of cycles of operation possible.

The invention claimed is:

1. A valve unit for pneumatic operation in a blow-molding process, comprising
    a) a valve housing having a process pressure input line, a process pressure output line and a process guide shaft,
    b) an operating piston for closing and opening a connection between the process pressure input line and the process pressure output line, wherein the operating piston defines a longitudinal central axis, and
    c) a first and a second control line and a first and a second control chamber for controlling the operating piston, wherein the operating piston has a first control surface which faces the first control chamber, and wherein the operating piston has a second control surface which faces the second control chamber, wherein the first control surface and the second control surface are able to be subjected to a control pressure each,
    wherein the operating piston can be displaced in the axial direction within the process guide shaft in a sealed manner by means of a dynamic process seal and
    wherein the operating piston has a closing ring which in a closed state of the connection sealingly abuts a valve seat of the valve housing,
    wherein the closing ring is designed as a circumferential sealing edge, wherein the valve seat consists of a softer and more elastic material than the circumferential sealing edge abutting said valve seat,
    wherein the circumferential sealing edge has a diameter which corresponds to a guide diameter of the dynamic process seal,
    wherein at least one of the two control chambers is of cylindrical configuration and is arranged centrally to the longitudinal central axis of the operating piston, thereby comprising the longitudinal central axis,
    wherein at least one of the first control surface and the second control surface of the operating piston is a front face in the shape of a mathematical circle area and
    wherein the operating piston has through-bores for connecting a valve chamber to a pressure compensation chamber.

2. The valve unit as claimed in claim 1, wherein the operating piston has a sealing cap, the sealing cap being of wedge-shaped configuration and having a circumferential tip, wherein the circumferential tip forms the circumferential sealing edge.

3. The valve unit as claimed in claim 1, wherein the valve seat is embedded in a valve seat ring arrangement, wherein the valve seat ring arrangement consists of a harder material than the valve seat.

4. The valve unit as claimed in claim 1, wherein an annular sealing element which comprises the valve seat is present and wherein the sealing element has the shape of a truncated cone with an outwardly widening base.

5. The valve unit as claimed in claim 1, wherein a first active surface and a second active surface, which counteract one another and which are able to be subjected to a process pressure, are present and wherein the first active surface and the second active surface are of the same size.

6. The valve unit as claimed in claim 1, wherein the first control chamber is connected via a first pilot bore to a first pilot valve and wherein the second control chamber is connected via a second pilot bore to a second pilot valve.

7. The valve unit as claimed in claim 1, wherein the first control surface and the second control surface are of the same size.

8. The valve unit as claimed in claim 1, wherein a first dynamic control chamber seal and a second dynamic control chamber seal are present, wherein the first dynamic control chamber seal and the second dynamic control chamber seal define a guide diameter each, and wherein the guide diameters of the first dynamic control chamber seal and the second dynamic control chamber seal are of the same size and are arranged centrally relative to the longitudinal central axis of the operating piston.

9. The valve unit as claimed in claim 8, wherein the guide diameter of the dynamic process seal is larger than at least one of the guide diameters of the first dynamic control chamber seal and the second dynamic control chamber seal.

10. The valve unit as claimed in claim 9, wherein the guide diameter of the dynamic process seal is larger than the guide diameter of the first dynamic control chamber seal and the guide diameter of the second dynamic control chamber seal.

11. The valve unit as claimed in claim 1,
wherein the operating piston has a piston foot, a piston head and a piston ring,
wherein the piston ring has a larger external diameter than the piston foot and the piston head,
wherein the piston foot and the piston head have the same external diameter,
wherein the valve housing has a first cylindrical central blind bore for receiving the piston foot and a second cylindrical central blind bore for receiving the piston head,
wherein the first control chamber is configured in the first blind bore and the second control chamber is configured in the second blind bore
and
wherein the circumferential sealing edge is configured on the piston ring.

12. The valve unit as claimed in claim 1,
wherein the operating piston has a base body with an H-shaped longitudinal section and a piston ring,
wherein the base body forms a downwardly open first receiver and an upwardly open second receiver,
wherein a fixed foot element and a fixed head element are configured on the valve housing,
wherein the foot element engages in the first receiver and the head element engages in the second receiver,
wherein the first receiver forms the first control chamber and the second receiver forms the second control chamber and
wherein the circumferential sealing edge is configured on the piston ring.

13. The valve unit as claimed in claim 1,
wherein the operating piston has a base body with a U-shaped longitudinal section and a piston ring,
wherein the base body forms an upwardly open first receiver,
wherein a fixed foot element is configured on the valve housing,
wherein the foot element engages in the first receiver, wherein the first receiver forms the first control chamber,
wherein the valve housing forms an annular gap around the piston ring,
wherein the annular gap forms the second control chamber and
wherein the circumferential sealing edge is configured on the piston ring.

14. The valve unit as claimed in claim 1, wherein both control chambers are of cylindrical configuration and are arranged centrally to the longitudinal central axis of the operating piston.

15. A valve unit for pneumatic operation in a blow-molding process, comprising
a) a valve housing having a process pressure input line, a process pressure output line and a process guide shaft,
b) an operating piston for closing and opening a connection between the process pressure input line and the process pressure output line, wherein the operating piston defines a longitudinal central axis, and
c) a first and a second control line and a first and a second control chamber for controlling the operating piston, wherein the operating piston has a first control surface which faces the first control chamber, and wherein the operating piston has a second control surface which faces the second control chamber, wherein the first control surface and the second control surface are able to be subjected to a control pressure each,
wherein the operating piston can be displaced in the axial direction within the process guide shaft in a sealed manner by means of a dynamic process seal and
wherein the operating piston has a closing ring which in a closed state of the connection sealingly abuts a valve seat of the valve housing,
wherein the closing ring is designed as a circumferential sealing edge, wherein the valve seat consists of a softer and more elastic material than the circumferential sealing edge abutting said valve seat,
wherein the circumferential sealing edge has a diameter which corresponds to a guide diameter of the dynamic process seal,
wherein at least one of the two control chambers is of cylindrical configuration and is arranged centrally to the longitudinal central axis of the operating piston, thereby comprising the longitudinal central axis,
wherein the operating piston has through-bores for connecting a valve chamber to a pressure compensation chamber and
wherein a first dynamic control chamber seal and a second dynamic control chamber seal are present, wherein the first dynamic control chamber seal and the second dynamic control chamber seal define a guide diameter each, and wherein the guide diameters of the first dynamic control chamber seal and the second dynamic control chamber seal are of the same size and are arranged centrally relative to the longitudinal central axis of the operating piston.

16. A valve unit for pneumatic operation in a blow-molding process, comprising
a) a valve housing having a process pressure input line, a process pressure output line and a process guide shaft,
b) an operating piston for closing and opening a connection between the process pressure input line and the process pressure output line, wherein the operating piston defines a longitudinal central axis, and
c) a first and a second control line and a first and a second control chamber for controlling the operating piston, wherein the operating piston has a first control surface which faces the first control chamber, and wherein the operating piston has a second control surface which faces the second control chamber, wherein the first control surface and the second control surface are able to be subjected to a control pressure each,
wherein the operating piston can be displaced in the axial direction within the process guide shaft in a sealed manner by means of a dynamic process seal and
wherein the operating piston has a closing ring which in a closed state of the connection sealingly abuts a valve seat of the valve housing,
wherein the closing ring is designed as a circumferential sealing edge, wherein the valve seat consists of a softer and more elastic material than the circumferential sealing edge abutting said valve seat,
wherein the circumferential sealing edge has a diameter which corresponds to a guide diameter of the dynamic process seal,
wherein at least one of the two control chambers is of cylindrical configuration and is arranged centrally to the longitudinal central axis of the operating piston, thereby comprising the longitudinal central axis, wherein the operating piston has through-bores for connecting a valve chamber to a pressure compensation chamber and wherein the operating piston has a piston foot, a piston head and a piston ring, wherein the piston ring has a larger external diameter than the piston foot and the piston head, wherein the piston foot and the piston head have the same external diameter, wherein the valve housing has a first cylindrical central blind bore for receiving the piston foot and a second cylindrical central blind bore for receiving the piston head, wherein the first control chamber is configured in the first blind bore and the second control chamber is configured in the second blind bore and wherein the circumferential sealing edge is configured on the piston ring.

* * * * *